UNITED STATES PATENT OFFICE.

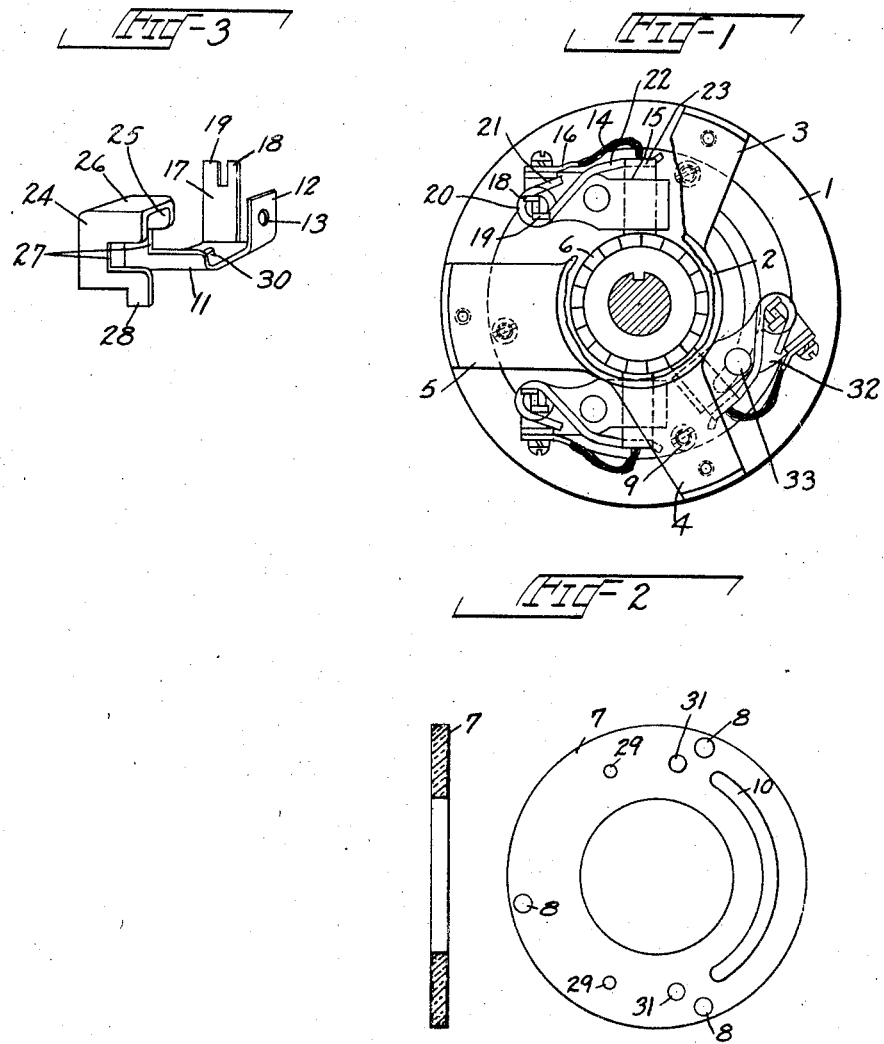

HENRY E. BORGER, OF NEWARK, NEW JERSEY, ASSIGNOR TO SPLITDORF ELECTRICAL COMPANY, OF NEWARK, NEW JERSEY.

MOUNTING FOR DYNAMO-BRUSHES.

1,342,583.   Specification of Letters Patent.   Patented June 8, 1920.

Application filed November 3, 1917. Serial No. 200,220.

*To all whom it may concern:*

Be it known that I, HENRY E. BORGER, a citizen of the United States, residing at Newark, in the county of Essex and State of New Jersey, have invented certain new and useful Improvements in Mountings for Dynamo-Brushes, of which the following is a specification.

In the designing of dynamos and motors for automotive vehicles, particularly motorcycles, where space is an all important thing, considerable attention must be given to the arrangement of the various parts in order to make the dynamo electric machine as compact as possible.

It is the object of my invention to provide a method of mounting the brushes on a dynamo electric machine which will be simple, compact and cheap to manufacture; and being compact allows the dynamo electric machine to be reduced in dimensions particularly that of its length.

In my application Serial No. 187,944, filed August 27, 1917, Patented July 1, 1919, No. 1,308,275, I have shown and described a dynamo electric machine particularly suited for use on automotive vehicles for charging separate batteries, furnishing current to lights, etc. My present invention relates to the method of mounting the commutator brushes used on the dynamo electric machine shown and described in said application.

In the drawing, Figure 1 is an end view of my electric machine with the dust cover removed and other parts cut away to show the commutator, brush holders and brushes.

Fig. 2 is a plan and vertical sectional view of the disk upon which the brush holders are mounted.

Fig. 3 is a perspective view of the brush holder.

Referring now particularly to the details, wherein like numbers refer to corresponding parts in the different views, 1 illustrates the field frame of the dynamo to which is attached, in any suitable manner, a commutator end bearing support 2. This bearing support is shown in the form of a triangular spider having arms 3, 4 and 5. At the center, the spider is cut away together with the armature shaft bearing in order to show the commutator 6 and the brush holders and brushes in working position. 7 is a disk of insulating material having holes 8 through which screws 9 are adapted to pass to fasten the disk 7 to the inside portion of the spider 2. 10 is an arcuate slot in the disk 7 used for the purpose of mounting one of the brush holders in an adjustable manner, which will be later referred to. The brush holder 11 as shown in Fig. 3 is punched and formed from one piece of metal. 12 is an ear having a threaded screw-hole 13 for the reception of a pigtail 14 that is fastened to the brush 15. In addition to receiving the terminal 16 of the pigtail 14 the ear 12 is also used for connecting one end of the dynamo circuit thereto. In some cases pigtails 14 may be dispensed with and current conveyed directly from the holders to the brushes although in the majority of cases I prefer to use a pigtail 14 in order to reduce brush losses. 17 is a lug having fingers 18 and 19. The lug 17 is used to support a tension member having a number of coiled portions 20 surrounding the lug 17. One end 21 of the tension member engages the ear 12 in such a way that the ear 12 constitutes an abutment for the end 21. The other end 22 of the tension member extends over the brush 15, which is preferably grooved at 23, so as to allow the end of the tension member to rest therein. A pocket is formed for the brush 15 in the holder 11 by the side walls 24 and 25 and the face wall 26. The back side of the pocket is formed by the disk 7 when the brush holder 11 is fastened thereto. The slots 27 in the side walls 24 and 25 serve as guideways for the end 22 of the tension member as it pushes the brush 15 outward, due to the wear of the brush on the commutator. When the brush has been worn down to what is considered its life wearing point the end 22 of the tension member comes against the bottom of the slots 27 which thus acts as a stop for the tension member. A dowel 28 is adapted to enter the holes 29 in the disk 7 in order to help guide and support the brush holder 11 on the disk 7. A hole 30 through the flat portion of the brush holder 11 is used to receive a rivet or screw which passes through the hole 31 in the disk 7. preferably metal is thrown outward around the hole 30 so as to allow for more threads where screws are used. In fact screws may be used and the heads riveted over after they are screwed in place as above described so as to prevent their coming loose and the brush holder 11 getting loose on the disk 7. After the body portion 20 of the tension member is slipped over the lug 17 the fingers 18 and 19 are bent outward so as to overlap the outer convolution of the coils thereby retaining the tension member in working position on the lug 17.

In my copending application previously referred to, I have shown and described a third brush generator, that is to say, the third brush is used for the purpose of regulating the current output of the generator. This third brush assembly is indicated by 32 in Fig. 1, a screw 33 with the necessary washers, etc., being used to pass through the slot 10 in the disk 7 and through the hole 30 in the holder 11. The dowel 28 also works in the slot 10 hence by loosening the screw 33 the brush holder and brush 32 may be slipped around on the disk to any desired position. For one direction of rotation of the dynamo two brush holders of the form shown in Fig. 3 are used and the other is formed in a reverse order and vice versa for the opposite direction of rotation.

From the above description it will be seen that I have provided a very simple, cheap and compact structure which may be modified in certain respects without departing from the scope of the appended claims.

Having thus described my invention what I claim is:—

1. In a dynamo electric machine, the combination of a commutator end bearing support, an annular disk of insulating material carried by and fastened directly to said support, a pair of brush holders mounted in fixed position on said disk, a third brush holder adjustably mounted on the disk and brushes supported in said holders for engaging the commutator, as described.

2. In a mounting for dynamo brushes, the combination of an annular disk of insulating material adapted to be carried by a dynamo, a one piece brush holder having the following characteristics; a pocket for a brush, an ear for attaching a brush conductor, a lug for supporting a brush tension member; with means for guiding and fastening the holder onto the disk.

3. In a mounting for dynamo brushes, the combination of an annular disk of insulating material adapted to be carried by a dynamo, a one piece brush holder having the following characteristics; a pocket for a brush, an ear for attaching a brush conductor, a lug for supporting a brush tension member having convolutions around the lug, said lug having fingers adapted to be bent over the outer convolution of the tension member to hold the same in working position on the lug, slots in the side walls of said pocket acting as guides for the brush tension member as it pushes the brush downward in the pocket, a dowel; and means for fastening the holder to the disk.

4. In a mounting for dynamo brushes, the combination of an annular insulating disk adapted to be carried by a dynamo, a one piece brush holder having three sides formed by the one piece holder and the other side formed by said disk, a brush to fit said pocket having a groove in its top and a pigtail, an ear to receive said pigtail, a brush tension member, a lug to support said tension member, said tension member having one end resting in the groove of said brush and the other hooked under said ear, means on said lug adapted to hold said tension member in place thereon, means common to two side walls of the pocket to guide the end of the tension member engaging the brush as said brush wears, said means also serving as a stop for the tension member, a dowel on the holder adapted to enter a coöperating hole in the disk, and means for fastening the holder to the disk.

5. In a mounting for dynamo brushes, the combination of an annular insulating disk adapted to be carried by a dynamo, a one piece brush holder having three sides formed by the one piece holder and the other side formed by said disk, a brush adapted to fit in said pocket, an ear for receiving a current conductor, a brush tension member having a coiled portion, a lug having fingers at its outer end to support said coiled portion of the tension member, said fingers being adapted to be bent over the outer end of the coiled portion to hold the same in working position on the lug, and one end of the tension member being hooked under said ear and the other end resting on the brush, slots in the walls of the pocket for said tension member serving as guides and a stop therefor, and means for fastening the holder to the disk.

6. In a mounting for dynamo brushes, the combination of an annular insulating disk adapted to be carried by a dynamo, an arcuate slot in said disk, a pair of brush holders adapted to be mounted on the disk on either side of said slot, a third brush holder adjustably fastened to said disk by means entering said slot, said brush holders having the following characteristics: a single piece of metal punched and formed to have a pocket for the brushes, a lug with fingers to support and retain a brush tension member, an ear to receive a current conductor and to act as an abutment for one end of the said tension members, slots in the walls of the pocket to act as guideways and a stop for the other end of the tension member, a dowel; and means for fastening the holder to the disk.

7. In a mounting for dynamo brushes, the combination of an annular insulating disk adapted to be carried by a dynamo, brush holders and brushes carried by said disk, said brush holders having the following characteristics: a single piece of metal punched and formed to have a pocket for the brushes, a lug with fingers to support and retain a brush tension member, an ear to receive a current conductor and to act as an abutment for one end of the said tension members, slots in the walls of the pocket to act as guideways and a stop for the other end of the tension member, a dowel; and means for fastening the holder to the disk.

In witness whereof, I affix my signature.

HENRY E. BORGER.